Dec. 27, 1960  W. OWEN  2,966,336
JACKING MECHANISM FOR ELONGATED MEMBERS
Filed Jan. 23, 1959  2 Sheets-Sheet 1

INVENTOR
WALLACE OWEN

BY
Watson, Cole, Grindle & Watson
ATTORNEY

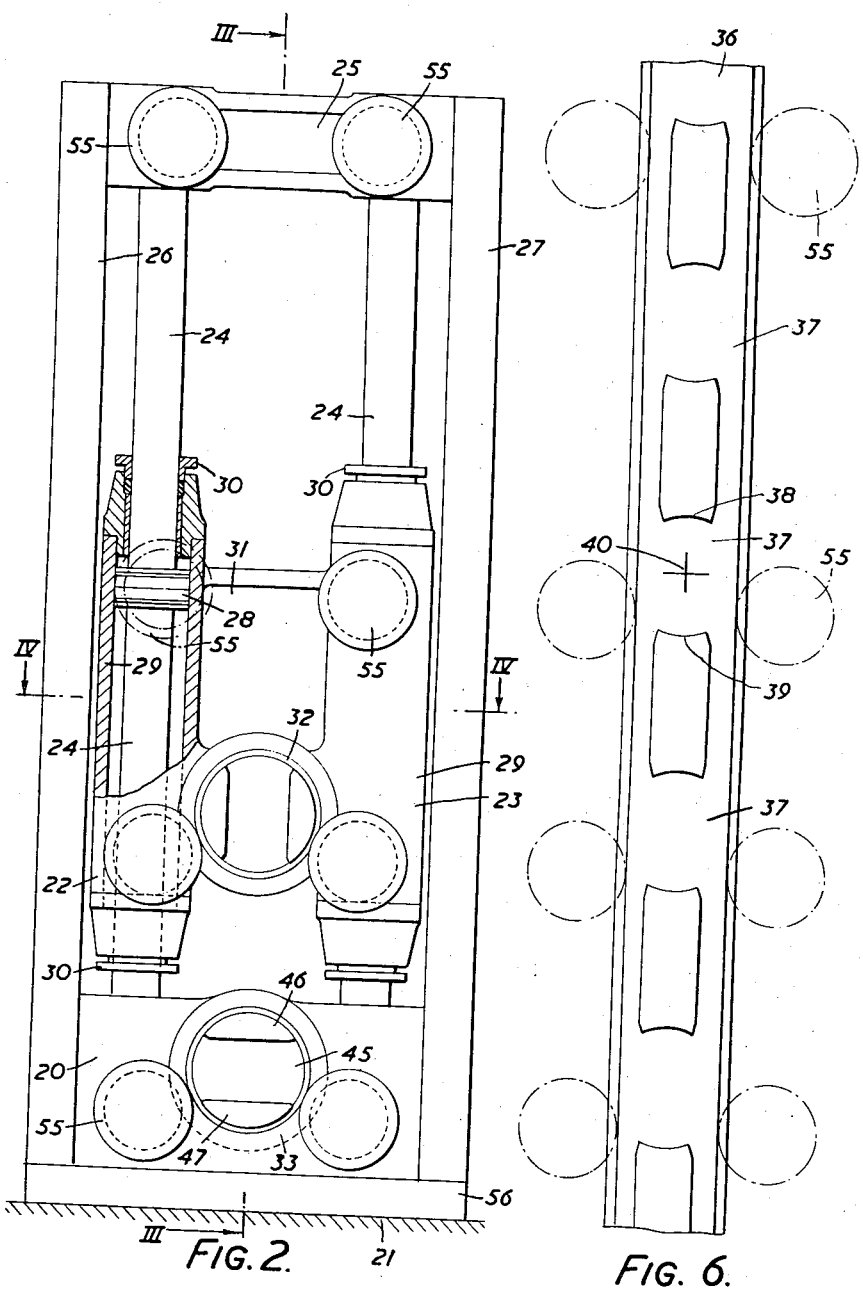

United States Patent Office 2,966,336
Patented Dec. 27, 1960

2,966,336

JACKING MECHANISM FOR ELONGATED MEMBERS

Wallace Owen, Beaumaris, Anglesey, North Wales, assignor to Saro (Anglesey) Limited Filed Jan. 23, 1959, Ser. No. 788,608

Claims priority, application Great Britain Jan. 24, 1958

5 Claims. (Cl. 254—106)

This invention relates to jacking mechanism for moving an elongated member such as a pile relative to a base structure, or vice versa, of the kind comprising an elongated part attached to or formed integral with the elongated member and provided with a series of longitudinally spaced interrupted abutments, two stepping members which are movable relative to one another and relative to the elongated member in the direction of movement, a power operated jacking device between the two stepping members or between each stepping member and the base structure, and locking means attached to each of these stepping members arranged to be engaged with the abutments or recesses in the elongated part to prevent relative longitudinal movement therebetween.

The invention is thus particularly applicable to jacking mechanism for lowering piles or casings from a floating barge and for lifting the barge over the water by continued operation of the jacking mechanism after the piles have bedded onto bottom.

According to the invention jacking mechanism for moving an elongated member relative to a base structure comprises an elongated part attached to or formed integral with the elongated member and provided with a series of longitudinally spaced interrupted abutments, two stepping members which are movable relative to one another and relative to the elongated member in the direction of movement, a power operated jacking device between the two stepping members, or between each stepping member and the base structure, and locking means attached to each of the stepping members, the locking means comprising a rotary member having a head of non-circular cross-section in planes normal to its rotary axis and so shaped that on rotation of the head into one position it engages with an abutment on the elongated part to lock the stepping member and the part against relative movement, while in another position of rotation of the head free longitudinal movement is permitted between the stepping member and the elongated part.

Preferably the head of the rotary locking member is in the form of a body of revolution with a diametral slot.

Thus in a particular preferred form of the invention the rotary head of the locking member is of cylindrical form with a diametrical groove in the face thereof adjacent the elongated part.

Moreover it is preferred that the lower face of each abutment on the elongated part is formed as part of a surface of revolution corresponding to the external surface of the rotary head on the locking member.

Where the elongated member is vertical, the rotary locking member is preferably arranged for rotation on a horizontal axis.

According to a preferred feature of the invention the mechanism includes guide means connected between the stepping members and the elongated member arranged to restrain the two members against relative movement in directions transverse to the primary direction of movement.

The invention may be performed in various different ways but one embodiment will now be described by way of example, as applied to mechanism for lifting or lowering piles from a base structure such as a floating barge.

In the accompanying drawings Figure 1 is a diagrammatic elevation, on a smaller scale than the remaining figures, of a submarine oil-drilling barge.

Figure 2 is a front elevation, partly in section, of the jacking mechanism, when viewed in the direction of the arrow A in Figure 4.

Figure 6 is a front elevation of the vertically toothed bar or rack attached to each pile, as seen in the direction of the arrow B in Figure 4.

Figure 1:
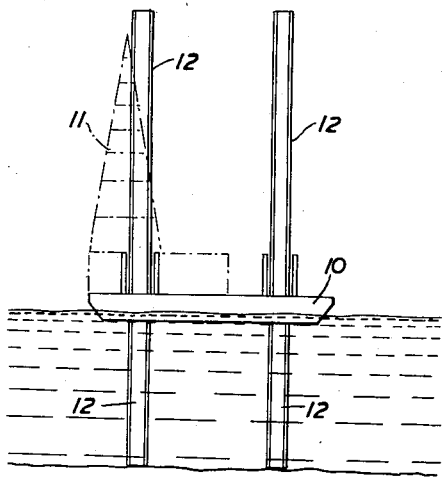

In Figure 1 the floating barge 10 carries a derrick 11 for drilling in ground beneath sea level, and a series of hollow cylindrical piles or caissons 12, which are vertically movable with respect to the barge, and pass through apertures therein, so that they can be projected downwards onto the bottom to anchor the barge, and even to raise it from the water. Each pile is associated with hydraulic jacking mechanism as illustrated in detail in the remaining drawings.

The jacking mechanism comprises a lower cross head 20 which constitutes the first stepping member and is secured to the floor 21 of the barge, and two parallel vertical double-acting hydraulic jacks 22, 23 mounted in tandem above this cross head. Each jack comprises a piston rod 24 which is rigidly connected at its lower end to the crosshead 20 and at its upper end to a cross piece 25, the cross piece being in turn rigidly connected to the barge by side girders 26, 27. At the mid point in each piston rod there is formed a hydraulic piston 28 and surrounding each rod is a hydraulic ram cylinder 29 the internal surface of which forms a close seal with the piston 28. Fluid tight seals 30 are provided at both ends of each ram cylinder on opposite sides of the respective piston and the two ram cylinders 29 are formed integral with a common bridging piece 31 which constitutes the second stepping member. Means are provided for admitting hydraulic fluid under pressure selectively to the upper and lower ends of each ram cylinder, but these means form no part of the present invention and will not be described in detail.

The cross head 20 and the bridging piece 31 are each formed with parallel horizontal bores in which are mounted hydraulic locking devices indicated at 32, 33.

Each pile 12 has attached to one side a vertical bar structure comprising a parallel sided plate 35 and a rectangular section bar or rack 36, rigidly secured to one another and to the pile by welding. The bar 36 is interrupted by a series of recesses 37 which pass through the whole width of the bar, the upper and lower surfaces 38, 39 of each recess being of concave curvature and lying on an imaginary cylinder having a horizontal axis 40 passing through the vertical centre line of the bar as seen in Figure 6. The diameter of this imaginary cylinder is considerably greater than the horizontal width of the bar.

Each of the locking devices 32, 33 for engagement with this elongated locking bar 36 comprises a rotary shaft 42 mounted in a sleeve 43 in one of the stepping members 20, 31 of the jacking mechanism and having an enlarged head 44 at its front end adjacent the locking bar this head being of generally cylindrical form and of slightly smaller diameter than the imaginary cylinder defining the end walls 38, 39 of each recess 37. Each rotary locking head 44 is formed with a diametral slot 45 whose transverse width is somewhat greater than the horizontal width of the locking bar 36. It will be seen therefore that when the locking head 44 is rotated so that the diametral slot 45 is vertical as shown in the upper locking device of Figure 2, the head is capable of sliding along the locking bar 36 which passes freely through the slot 45 in the head. When the head is rotated at right angles to this position however the segments 46, 47 of the head on either side of the slot 45 engage with one or other of the curved surfaces 38, 39 of the recess to prevent any such relative vertical movement.

Figure 5:
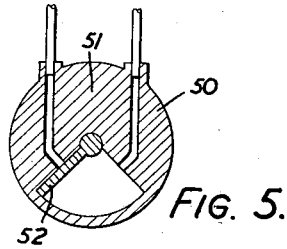
Figure 5 is a cross-sectional view through one of the hydraulic rotary actuators, on the line V—V in Figure 3.

The rear end of each rotary shaft 42 to which the head 44 is secured is attached to a hydraulic rotary actuator 50, comprising a casing containing a fixed radial partition 51 (as shown in Figure 5) and a rotating vane 52, attached to the shaft 42. Hydraulic fluid may be admitted selectively to either side of the partition 51, through conduits 53, 54, to cause the required rotation of the shaft.

Figure 3:
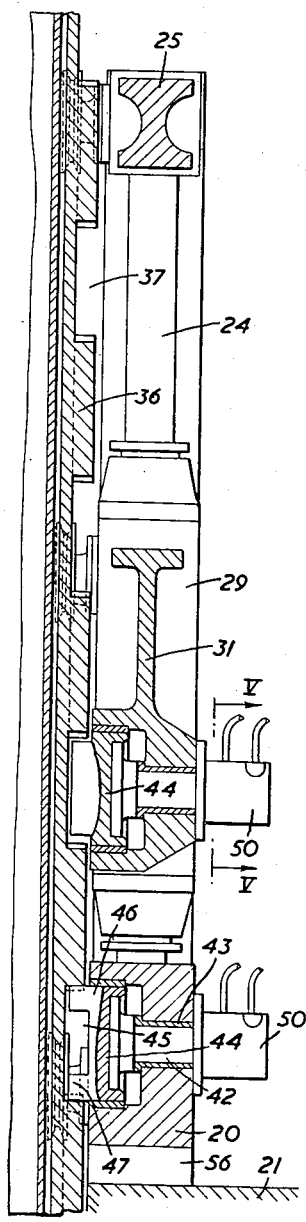
Figure 3 is a sectional side elevation on the line III—III in Figure 2.
Figure 4:
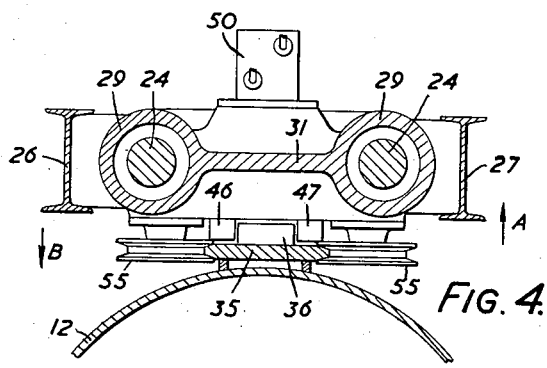
Figure 4 is a sectional plan view on the line IV—IV in Figure 2.

To ensure correct positioning of the locking heads 44 relative to the bar 36 the jacking mechanism is provided with four pairs of grooved rollers 55, engaging opposite sides of the plate 35. It may be desirable accordingly to provide a flexible or pivotal connection between the jacking mechanism, such connection being illustrated diagrammatically by the unit 56 in Figure 3.

The actuation of the jacking mechanism and the locking means is automatically synchronised to provide substantially continuous movement of each pile relative to the barge. Thus in operation with the locking means 33 of the lower stepping member 20 engaged with the bar 36 the hydraulic jacks 22, 23 will be actuated to lift the upper stepping member 31 through a predetermined travel and at the limit of this travel the locking means 32 of the upper stepping member will be engaged with the bar 36. The locking members 32 of the lower stepping member will then automatically be disengaged and the jacking mechanism will be reversed in order to lift the lower member 20, thus at the same time lifting the barge relative to the pile, or lowering the pile relative to the barge. The locking means of the lower stepping member are then engaged after the predetermined travel limit has been reached and the cycle is then repeated.

What I claim as my invention and desire to secure by Letters Patent is:

1. The combination of base structure, an elongated member such as a pile guided for movement in a direction parallel to its longitudinal axis relatively to the base structure, and jacking means for moving the elongated member relatively to the base structure in the said direction, said elongated member being formed with a longitudinal row of longitudinally-spaced laterally-protruding abutment blocks, the said blocks affording end faces and parallel side faces, the opposed end faces of each pair of adjacent blocks defining between them a recess, said jacking means comprising at least one power-operated jack, the said jack including a fixed and a moving jack part of which the fixed jack part is secured rigidly to the base structure, a first stepping means rigidly secured to the fixed jack part and a second stepping means rigidly secured to the moving jack part, each stepping means comprising a rotary locking member mounted for rotation about an axis which is at right angles to the said direction and which is generally radial to the elongated member, each rotary member having a locking head having an end face formed with protruding lugs separated by a diametral groove whose width is slightly greater than the width between side faces of each abutment block, and means for rotating the rotary member of each stepping means between a locking position in which the groove in its end face extends transversely to the longitudinal axis of the elongated member and the lugs protrude into the recess between a pair of abutment blocks, thereby preventing movement of the elongated member relatively to the base structure in the said longitudinal direction, and a free position in which the groove extends parallel to the longitudinal axis of the elongated member and the lugs lie outside the side faces of the abutment blocks and permit the latter to pass longitudinally through the groove.

2. The combination of base structure, an elongated member such as a pile guided for movement in a direction parallel to its longitudinal axis relatively to the base structure, and jacking means for moving the elongated member relatively to the base structure in the said direction, said elongated member being formed with a row of longitudinally-spaced laterally-protruding abutment blocks extending along its length, the said blocks affording parallel side faces and arcuate concave end faces, the opposed concave end faces of each pair of adjacent blocks defining between them a recess, said jacking means comprising a pair of power-operated jacks arranged side by side, the said jacks including fixed and moving jack parts of which the fixed jack parts are secured rigidly to the base structure, a first stepping means rigidly secured to the fixed jack parts between the two jacks and a second stepping means rigidly secured to the moving jack parts between the two jacks, each stepping means comprising a rotary locking member mounted for rotation about an axis which is at right angles to the said direction and which is generally radial to the elongated member, each rotary member having a cylindrical locking head having an end face formed with protruding segmental lugs separated by a diametral groove whose width is slightly greater than the width between side faces of each abutment block, and means for rotating the rotary member of each stepping means between a locking position in which the groove in its end face extends transversely to the longitudinal axis of the elongated member and the segmental lugs protrude into the recess between a pair of abutment blocks, thereby preventing movement of the elongated member relatively to the base structure in the said longitudinal direction, and a free position in which the groove extends parallel to the longitudinal axis of the elongated member and the segmental lugs lie outside the side faces of the abutment blocks and permit the latter to pass longitudinally through the groove.

3. The combination claimed in claim 2 in which the arcuate concave end faces of each pair of adjacent abutment blocks lie on a circle whose radius is only slightly greater than that of the cylindrical head of each stepping means.

4. The combination claimed in claim 2 in which the fixed parts of the jacks comprise two jack plungers rigidly secured together in parallel side by side relationship by a crosshead which is secured to the base structure, the first stepping means being mounted on the crosshead between the plungers, and in which the moving jack parts comprise a pair of jack casings into which the plungers respectively extend, the casings being rigidly secured together by a bridging member on which the second stepping means is mounted.

5. The combination claimed in claim 2 including hydraulic motor means associated with each stepping means and arranged to rotate the rotary member between its locking and its free positions.

References Cited in the file of this patent

UNITED STATES PATENTS 2,822,670    Suderow _____ Feb. 11, 1958

FOREIGN PATENTS 612,201    Great Britain _____ Nov. 9, 1948